United States Patent
Choi et al.

(10) Patent No.: US 7,778,264 B2
(45) Date of Patent: Aug. 17, 2010

(54) APPARATUS AND METHOD FOR SETTING TIMER AND COUNTER IN MOBILE COMMUNICATION SYSTEM

(75) Inventors: Woo-Young Choi, Incheon (KR); Sung-Ik Park, Hwaseong-si (KR); Jong-Cheul Park, Suwon-si (KR)

(73) Assignee: Samsung Electronic Co., Ltd., Suwon-si (KR)

( * ) Notice: Subject to any disclaimer, the term of this patent is extended or adjusted under 35 U.S.C. 154(b) by 84 days.

(21) Appl. No.: 12/183,017

(22) Filed: Jul. 30, 2008

(65) Prior Publication Data

US 2009/0034547 A1   Feb. 5, 2009

(30) Foreign Application Priority Data

Jul. 31, 2007   (KR) ............... 10-2007-0076782
Nov. 20, 2007   (KR) ............... 10-2007-0118738

(51) Int. Cl.
*H04L 12/28* (2006.01)
*H04L 12/56* (2006.01)

(52) U.S. Cl. .................. 370/410; 370/252; 370/328

(58) Field of Classification Search ................ 370/410, 370/508, 519, 338, 235, 236, 252, 496, 522, 370/328

See application file for complete search history.

(56) References Cited

U.S. PATENT DOCUMENTS

| 7,356,722 B2* | 4/2008 | Lau et al. .................. 713/400 |
| 2007/0097903 A1* | 5/2007 | Roy et al. .................. 370/328 |
| 2008/0130534 A1* | 6/2008 | Tomioka .................... 370/310 |
| 2008/0144500 A1* | 6/2008 | Chen et al. ................. 370/235 |

\* cited by examiner

*Primary Examiner*—Brian D Nguyen
(74) *Attorney, Agent, or Firm*—Jefferson IP Law, LLP (57) ABSTRACT

A method of setting a timer value and a counter value depending on Radio Signal Strength (RSS) information according to a communication protocol is provided. In the method of determining the counter value and the timer value of a Mobile Station (MS) in a protocol negotiation process includes measuring a Round Trip Delay (RTD) and an RSS with respect to a counterpart MS, determining a timer value and a counter value according to the measured RTD and RSS, and exchanging a signaling message according to the determined timer value and counter value.

24 Claims, 7 Drawing Sheets

```
A) TOP-LEVEL MESSAGE SYSTEM
MultimediaSystemControlMessage              ::=CHOICE
{
        request                 RequestMessage,
        response                ResponseMessage,
        command                 CommandMessage,
        indication              IndicationMessage,
        ...
}
B) TIME MEASUREMENT RequestMessage
RequestMessage                              ::=CHOICE
{
        nonStandard             TimeMeasureRequest
        masterSlaveDetermination   MasterSlaveDetermination,
        ...'
}
C) TIME MEASUREMENT RESULT ResponseMessage
ResponseMessage                             ::=CHOICE
{
        nonStandard             TimeMeasureResponse
        ...'
}
D) TIMER VALUE REPORT MESSAGE
IndicationMessage                           ::=CHOICE
{
        nonStandard             SetTimeValueIndication,
        functionNotUnderstood   FunctionNotUnderstood,
         masterSlaveDeterminationRelease   MasterSlaveDeterminationRelease,
        terminalCapabilitySetRelease      TerminalCapabilitySetRelease,
                ....'
}
```

FIG.7

APPARATUS AND METHOD FOR SETTING TIMER AND COUNTER IN MOBILE COMMUNICATION SYSTEM

PRIORITY

This application claims the benefit under 35 U.S.C. §119(a) of a Korean patent application filed in the Korean Intellectual Property Office on Jul. 31, 2007 and assigned Serial No. 2007-76782 and a Korean patent application filed in the Korean Intellectual Property Office on Nov. 20, 2007 and assigned Serial No. 2007-118738, the entire disclosures of both of which are hereby incorporated by reference.

BACKGROUND OF THE INVENTION

1. Field of the Invention

The present invention relates to Video Telephony (VT) in a Mobile Station (MS) and a mobile communication system. More particularly, the present invention relates to a technique for increasing a call success ratio for VT in an MS and a mobile communication system.

2. Description of the Related Art

When Video Telephony (VT) is performed in mobile communication systems, Mobile Stations (MSs) at both ends of a communication link mutually exchange video stream data and may both use an H.245 protocol to control the stream data.

In the H.245 protocol, control messages are transmitted and received to mediate performance and a channel between the MSs. The control messages are used to perform various functions for MS capability exchange, opening and closing logical channels, mode request, flow control, etc.

In addition, the control messages may be used for master/slave determination and delay time determination.

The H.245 protocol also manages Quality of Service (QoS) control and negotiation for compatibility between the MSs. The QoS control includes frame/bit-rate adjustment, video size adjustment, fast update request, etc.

The VT is achieved when the negotiation process is performed by exchanging signaling messages over the protocol, and thereafter, actual video and audio data are transmitted according to a preset data format.

In addition to the exchange of signaling messages using the protocol, service providers of the mobile communication system require transmission of the video data of a counterpart user within several seconds. In particular, for each service provider, it is recommended that they be capable of achieving an average VT success ratio of over 90%.

When the signaling messages are exchanged, timer and counter information defined in international standards and service providers' standard documents are defined and used. The timer and counter information is used to handle errors and exceptions which may occur while dealing with requests and acknowledges generated in the process of exchanging the signaling messages.

Figure 1:
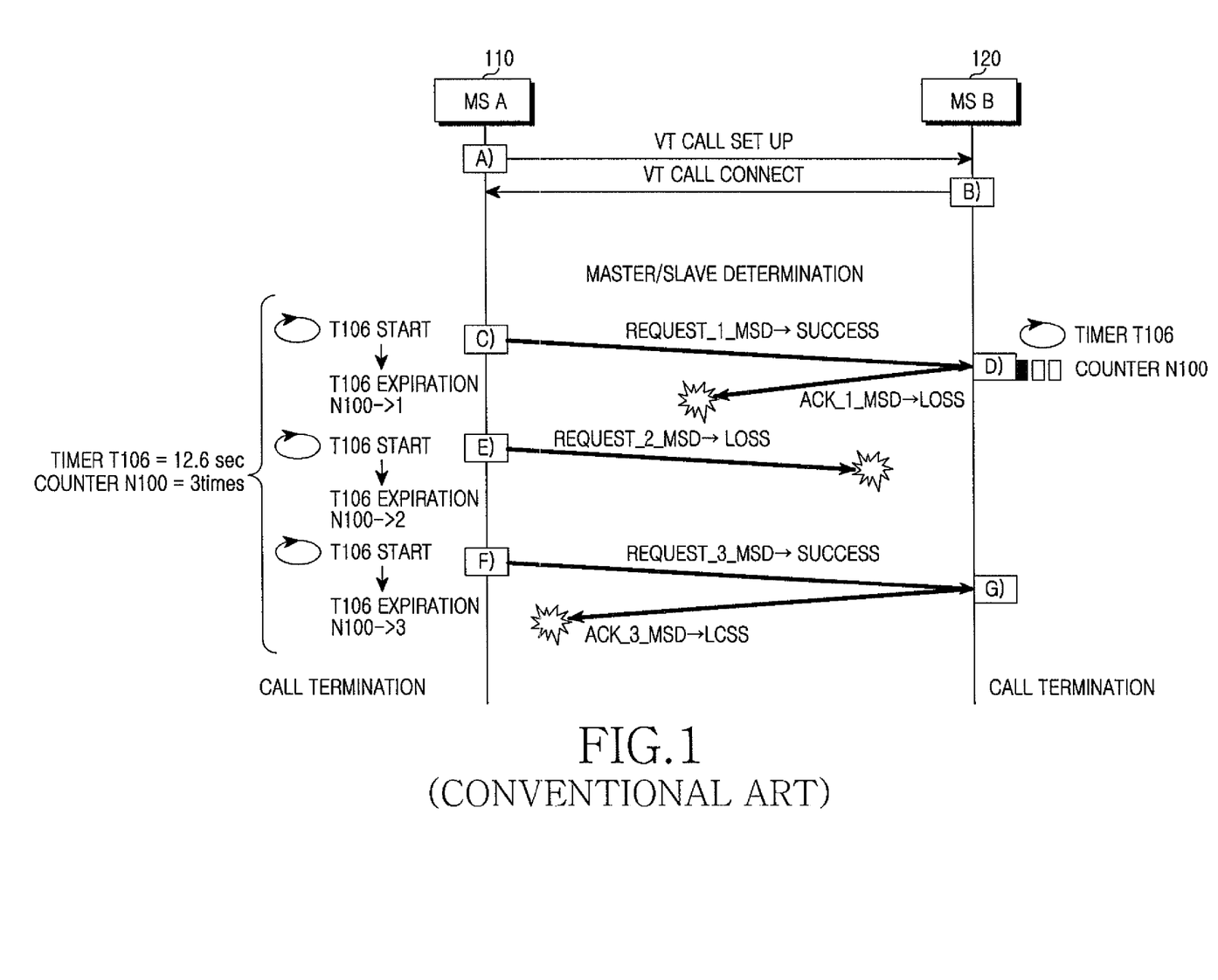
FIG. 1 illustrates a conventional signaling procedure.

FIG. 1 illustrates a conventional signaling procedure.

Referring to FIG. 1, a signaling message is exchanged in five steps according to a standard, wherein each step uses a fixed timer and a fixed retry counter.

First, an MS A 110 and an MS B 120 transmit VT call setup and VT call connection messages to perform VT in steps A and B. Thereafter, a Master/Slave Determination (MSD) process is performed. For the MSD process, a timer is set to 12.6 sec, and the retry counter is set to 3 times.

If the timer and the counter are fixedly defined irrespective of a Radio Signal Strength (RSS), they may cause a failure to operate within a required time resource in a VT system.

If the retry is performed 3 times in steps C to G as the timer expires at 12.6 sec, a time consumed in the MSD process is 37.8 sec, resulting in a VT connection failure.

In a worse case scenario, theses five steps C to G may be repeated two times to attempt to establish a connection. In this case, a time required for connection is 126 sec (i.e., (12.6 sec*2 times)*5 steps=126)).

Accordingly, if the timer and the counter are fixedly used irrespective of the RSS in the signaling procedure, the retry counter increases when the RSS is low. As a result, significant time delay occurs, which is a primary cause of a call failure.

SUMMARY OF THE INVENTION

An aspect of the present invention is to address at least the above-mentioned problems and/or disadvantages and to provide at least the advantages described below. Accordingly, an aspect of the present invention is to provide an apparatus and method for setting a timer and a counter in a mobile communication system.

Another aspect of the present invention is to provide an apparatus and method for improving a Video Telephony (VT) success ratio by using a dynamic counter and a dynamic timer according to information on a Radio Signal Strength (RSS) and a Round Time Delay (RTD), in order to reduce a processing time of protocol signaling entities in a transmitting-side Mobile Station (MS) and a receiving-side MS when VT is performed.

In accordance with an aspect of the present invention, a method of determining a counter value and a timer value of an MS in a protocol negotiation process is provided. The method includes measuring an RTD and an RSS with respect to a counterpart MS, determining the timer value and the counter value according to the measured RTD and RSS, and exchanging a signaling message according to the determined timer value and counter value.

In accordance with another aspect of the present invention, an MS for determining a counter value and a timer value in a protocol negotiation process is provided. The MS includes a timer manager for measuring an RTD and an RSS with respect to a counterpart MS and for determining the timer value according to the measured RTD and RSS, a counter manager for measuring an RTD and an RSS with respect to the counterpart MS and for determining the counter value according to the measured RTD and RSS, and a controller for exchanging a signaling message according to the determined timer value and counter value.

In accordance with another aspect of the present invention, a method of performing VT of an MS is provided. The method includes requesting a call for performing VT with a counterpart MS, measuring an RTD and RSS with respect to the counterpart MS, determining a timer value and a counter value according to the measured RTD and RSS, exchanging a signaling message according to the determined timer value and counter value, and performing the VT when the signaling message is successfully exchanged.

In accordance with another aspect of the present invention, an MS for performing VT is provided. The MS includes a timer manager for measuring an RTD and an RSS with respect to a counterpart MS and for determining a timer value according to the measured RTD and RSS, a counter manager for measuring the RTD and the RSS with respect to the counterpart MS and for determining a counter value according to the measured RTD and RSS, and a controller for requesting a call for performing VT with the counterpart MS, for exchanging a signaling message according to the determined timer value and counter value, and for performing the VT when the signaling message is successfully exchanged.

In accordance with another aspect of the present invention, a method of performing VT using an H.245 protocol of an MS is provided. The method includes requesting a call for performing VT with a counterpart MS, transmitting a first request message for requesting a time measurement to the counterpart MS, receiving a first response message in response to the first request message, measuring a first time difference between an arrival time of the first response message and a transmission time of the first request message, transmitting the first time difference to the counterpart MS by using a first indication message including, determining a timer value and a counter value according to the first time difference, exchanging a signaling message according to the determined timer value and counter value, and performing the VT when the signaling message is successfully exchanged.

In accordance with another aspect of the present invention, an MS for performing VT is provided. The MS includes a timer manager for measuring a first time difference between an arrival time of a first response message and a transmission time of a first request message for requesting a time measurement to a counterpart MS, for transmitting the first time difference to the counterpart MS by using a first indication message, and for determining a timer value according to the first time difference, a counter manager for determining a counter value according to the first time difference, and a controller for requesting a call for performing VT with the counterpart MS, for exchanging a signaling message according to the determined timer value and counter value, and for performing the VT when the signaling message is successfully exchanged.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention described hereinafter are related to an apparatus and method for setting a timer and a counter in a mobile communication system.

A Radio Signal Strength (RSS) is a primary influential factor on a likelihood of successfully establishing a Video Telephony (VT) connection. Signaling over a protocol used irrespective of the RSS is a secondary influential factor on a likelihood of successfully establishing a VT.

RSS is predominantly influenced by a geographical factor, which cannot be taken into account in the system. However, if all operations of a signaling procedure are flexibly carried out when signaling is performed over the protocol, that is, if timer/counter values can be adjusted, a call success ratio can be improved.

For this, RSS is classified into specific levels (e.g., weak/normal/strong, where weak RSS is in the range of −90 to 100 dB). In addition, in a signaling operation for attempting VT reception and transmission, the system uses the timer and the counter which are set according to the RSS of a current network.

A strong RSS is a condition where Transmit (Tx)/Receive (Rx) data loss does not occur frequently and a Tx/Rx rate is above 90%. Normal RSS is a condition where data loss occasionally occurs and the Tx/Rx rate is in the range of 60% to 90%. Weak RSS is a condition where the data loss frequently occurs and the Tx/Rx rate is below 60%.

Since each RSS level has a different data Tx/Rx rate, the VT success ratio can be increased by dynamically changing the timer/counter values to be used.

Figure 2:
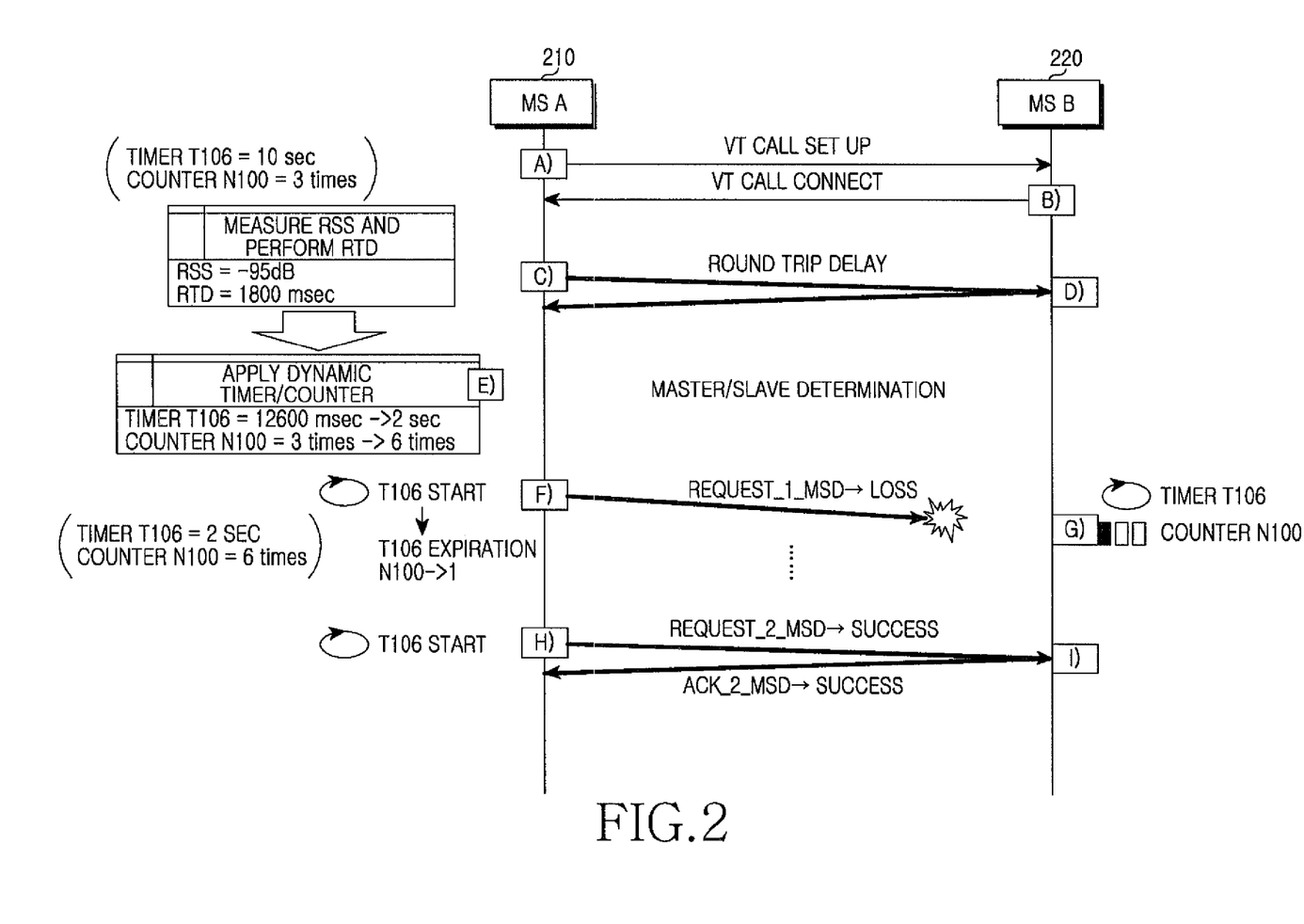
FIG. 2 illustrates a signaling procedure according to an exemplary embodiment of the present invention.

FIG. 2 illustrates a signaling procedure according to an exemplary embodiment of the present invention.

Referring to FIG. 2, an optimal timer and an optimal counter are set by considering an RSS and a Round Trip Delay (RTD) in order to remove uncertainty of a connection success ratio. The uncertainty occurs when time resources are wasted since fixed timer/counter values are used in a process of exchanging various signaling messages according to a VT protocol (i.e., H.245).

First, a Mobile Station (MS) A 210 and an MS B 220 transmit VT call setup and VT call connection messages to perform VT in steps A and B.

The RTD and the RSS are measured in steps C and D.

A new timer and a new counter are set according to the measured RTD and the measured RSS in step E.

If the RSS is strong and the RTD is short, the counter and the timer use default values. This is because no problem occurs in the process of exchanging the signaling messages due to the strong RSS and the short RTD.

If the RSS is strong and the RTD is long, the timer value is increased and the counter value is set to the default value.

If the RSS is weak and the RTD is short, the timer value is set to the default value and the counter value is increased.

If the RSS is weak and the RTD is long, the timer value is decreased and the counter value is increased.

The weaker the RSS, the higher the probability of the message transmission failing. Thus, when the RSS is weak, the counter value indicating the number of times of retransmitting the signaling message should be increased. In addition, the longer the RTD, the greater the amount of time required for transmitting the signaling message. Thus, when the RTD is long, the timer value is increased.

If the RSS is weak and the RTD is long, more time is required to transmit the signaling message and the probability of the message transmission failing is increased. Therefore, in this case, the counter value is increased and the timer value is decreased.

A Master/Slave Detection (MSD) process is performed in steps F to I.

The MSD process uses an updated timer value of 2 sec and an updated retry counter of 6 times.

If the existing timer/counter values are used which are not yet updated, an amount of time consumed in the MSD process is 37.8 sec when the retry is performed 3 times as a timer expires at 12.6 sec. However, if the updated timer/counter values are used, only 12 sec is consumed in the MSD process.

By using the updated timer/counter values in each step of signaling, signaling can be reliably completed and thus a call success ratio is increased.

Figure 3:
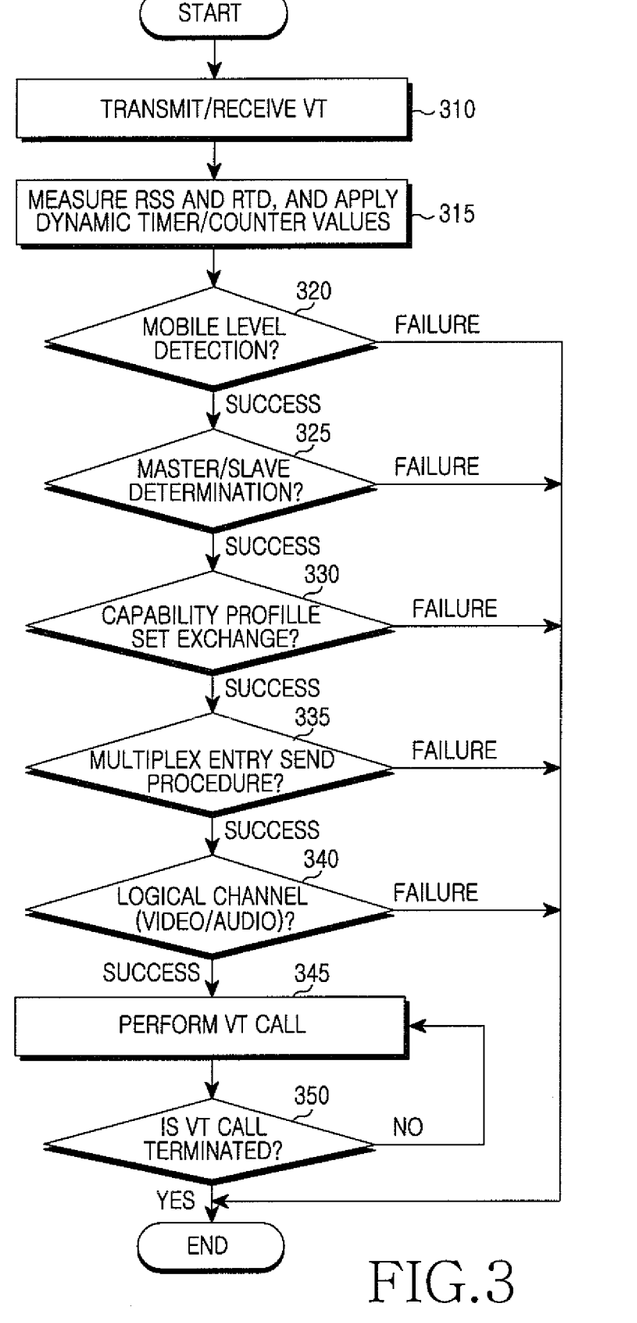
FIG. 3 is a flowchart illustrating a signaling procedure according to an exemplary embodiment of the present invention.

FIG. 3 is a flowchart illustrating a signaling procedure according to an exemplary embodiment of the present invention.

Referring to FIG. 3, a Tx MS and an Rx MS start the signaling procedure specified in the protocol for VT transmission/reception in step 310.

An RSS and an RTD are measured, and timer/counter values are updated as described with reference to FIG. 2 in step 315.

According to the updated timer/counter values, a signaling message is completely exchanged in steps 320 to 340. If all steps are successfully performed, the VT call is continued in step 345 until it is terminated in step 350.

The process of exchanging the signaling message in steps 320 to 340 includes "mobile level detection" for determining an MS level in step 320, "master/slave determination" for determining a master/slave MS in step 325, "capability profile set exchange" for exchanging MS capability in step 330, "multiplex entry send procedure" for defining multiple transmission in step 335, and "logical channel (video/audio)" for determining logical channels in step 345.

Thereafter, the procedure of FIG. 3 ends.

Figure 4:
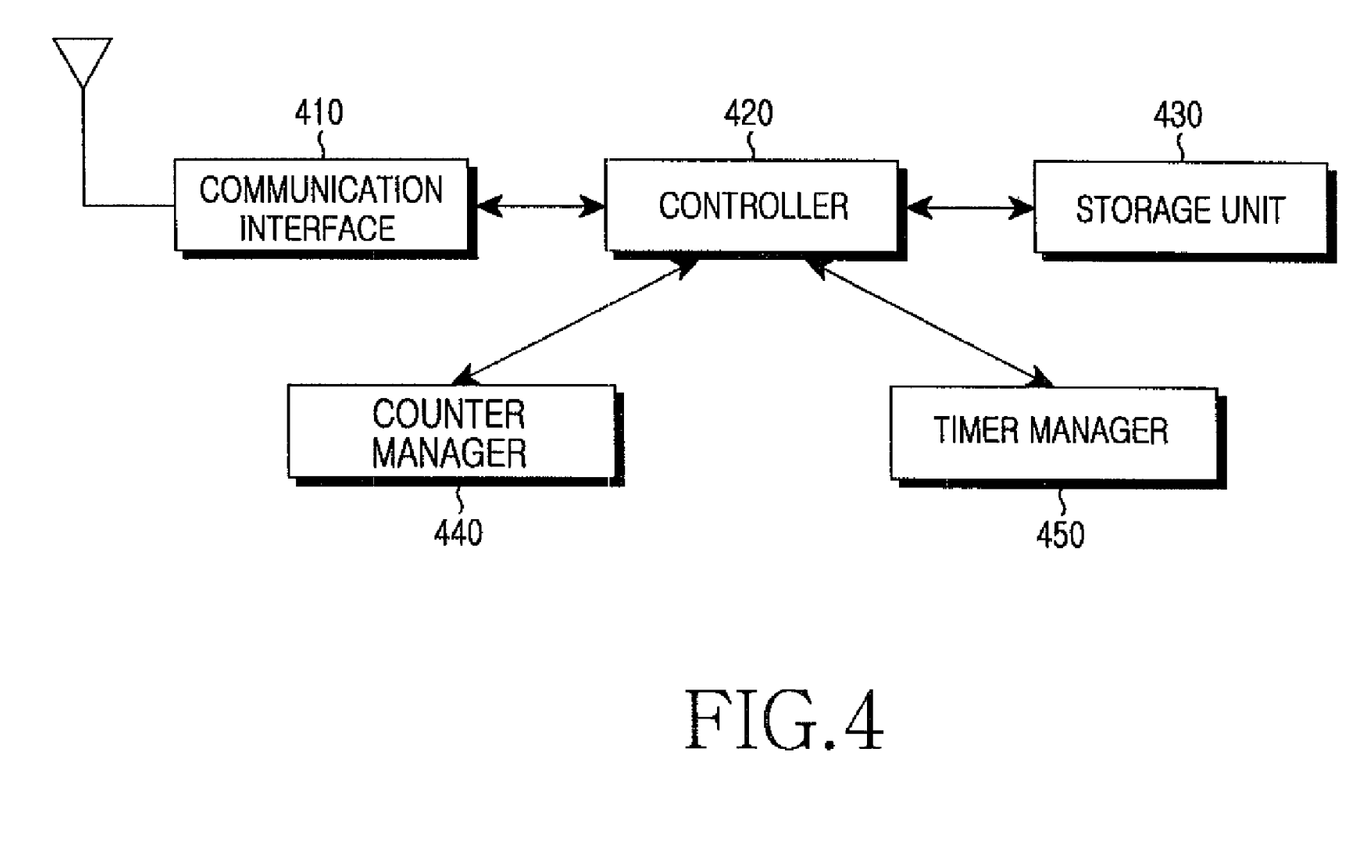
FIG. 4 is a block diagram of a Mobile Station (MS) according to an exemplary embodiment of the present invention.

FIG. 4 is a block diagram of an MS according to an exemplary embodiment of the present invention.

Referring to FIG. 4, the MS includes a communication interface 410, a controller 420, a storage unit 430, a counter manager 440, and a timer manager 450.

The communication interface 410 is a module for communicating with other nodes and includes a wireless processor, a baseband processor, etc. The wireless processor converts a signal received through a wireless path into a baseband signal and provides the converted signal to the baseband processor. Further, the wireless processor converts the baseband signal provided from the baseband processor into a signal that can be transmitted on the wireless path, and then transmits the converted signal through an antenna.

The controller 420 provides overall control of the MS. Further, according to an exemplary embodiment of the present invention, the controller 420 controls the counter manager 440 and the timer manager 450. Furthermore, the controller 420 exchanges a signaling message according to a determined timer/counter value.

The counter manager 440 determines the counter value by measuring an RTD and an RSS.

The timer manager 450 determines the timer value by measuring the RTD and the RSS.

If the RSS is strong and the RTD is short, the counter and the timer use default values. This is because no problem occurs in the process of exchanging the signaling messages due to the strong RSS and the short RTD.

If the RSS is strong and the RTD is long, the timer value is increased and the counter value is set to the default value.

If the RSS is weak and the RTD is short, the timer value is set to the default value and the counter value is increased.

If the RSS is weak and the RTD is long, the timer value is decreased and the counter value is increased.

The storage unit 430 stores a program for controlling overall operations of the MS and stores temporary data generated while executing the program.

In the aforementioned structure, the controller 420 can perform functions of the counter manager 440 and the timer manager 450. Although these elements are separately implemented in an exemplary embodiment of the present invention, this is for explanation purposes only.

Therefore, the controller 420 may be implemented to perform all or some of the functions of the counter manager 440 and the timer manager 450.

Figure 5:
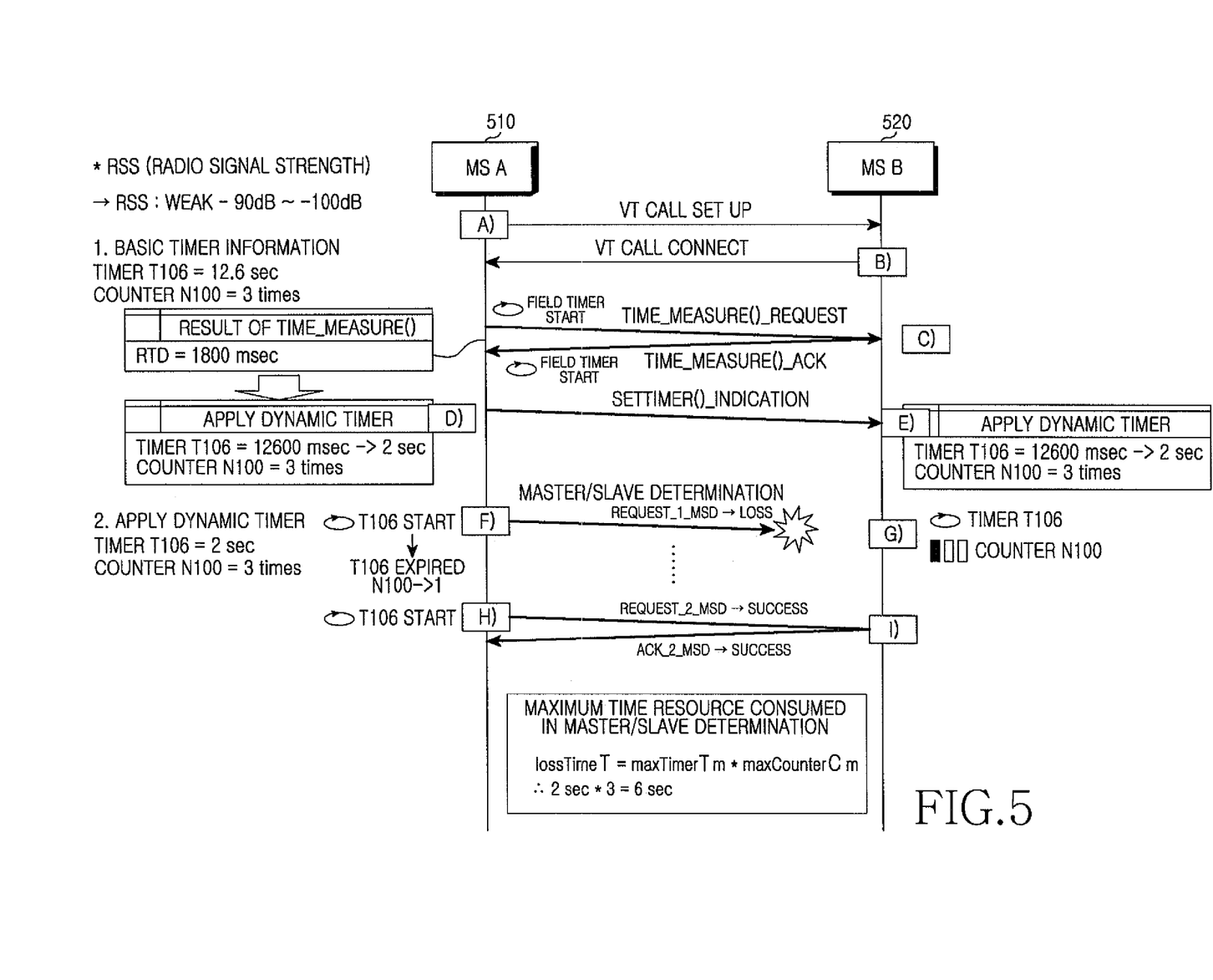
FIG. 5 illustrates a protocol signaling procedure using a dynamic timer according to an exemplary embodiment of the present invention.

FIG. 5 illustrates a protocol signaling procedure using a dynamic timer according to an exemplary embodiment of the present invention.

Referring to FIG. 5, the dynamic timer is assumed to be compliant with an H.324M protocol. The H.324M protocol includes the H.245 protocol in which control messages are transmitted and received to mediate performance and a channel between MSs. The control messages are used to perform various functions for capability exchange, opening and closing logical channels, mode request, flow control, general command and instruction processes, etc.

In addition, the control messages may also be used to support master/slave determination, capability exchange for performance between two MSs, logical channel signaling and bidirectional logical channel signaling, closed logical channel signaling mode request, delay determination, etc.

A request for storing video content proposed in an exemplary embodiment of the present invention and a control command such as user security key transmission in a transmitting side are managed according to the H.245 protocol.

In particular, a VT success ratio can be increased according to an exemplary embodiment of the present invention by using an optimal timer value. The timer value is dynamically set by additionally using a time measurement protocol through data transmission/reception in an actual network. The reason for using the dynamically set value is to remove uncertainty of a connection success ratio. The uncertainty occurs when time resources are wasted since fixed timer/counter values are used in a process of exchanging and negotiating various protocol messages according to the H.245 protocol that operates for initial connection of the VT protocol.

First, an MS A 510 and an MS B 520 transmit VT call setup and VT call connection messages to perform VT in steps A and B.

Thereafter, the MS A 510 performs a timing setup process with the MS B 520.

The timing setup process is performed in such a manner that the MS A 510 transmits a "Time_Measure( )_Request" message to the MS B 520, and in response thereto, the MS B 520 transmits a "Time_Measure( )_ACK" message in step C.

The MS A 510 measures an RTD and, according to the measured RTD, sets and applies a new timer and a new counter in step D. Further, the MS A 510 transmits the measured RTD value to the MS B 520 by using a "SetTimer( )_Indication" message.

The MS B 520 sets and applies a timer value and a counter value according to the RTD value in step E.

An MSD process is performed in steps F to I.

The MSD process uses an updated timer value of 2 sec and an updated retry counter of 6 times.

If the existing timer/counter values are used which are not yet updated, a time consumed in the MSD process is 37.8 sec when the retry is performed 3 times as the timer expires at 12.6 sec. However, if the updated timer/counter values are used, only 12 sec is consumed in the MSD process.

By using the updated timer/counter values in each step for signaling, signaling can be reliably completed and thus a call success ratio is increased.

Figure 6:
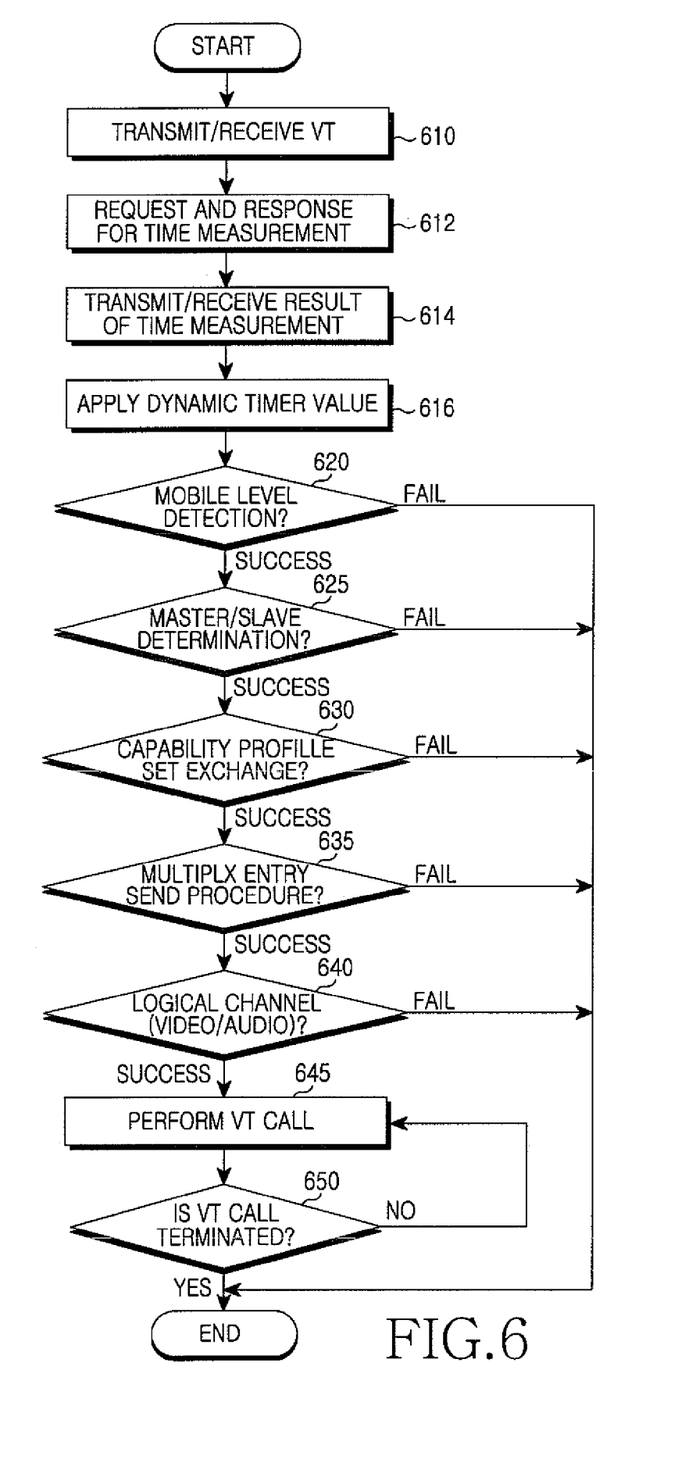
FIG. 6 is a flowchart illustrating a protocol signaling procedure using a dynamic timer according to an exemplary embodiment of the present invention.

FIG. 6 is a flowchart illustrating a protocol signaling procedure using a dynamic timer according to an exemplary embodiment of the present invention.

Referring to FIG. 6, an MS A and an MS B first transmit VT call setup and VT call connection messages to perform VT in step 610. Thereafter, the MS A performs a timing setup process with the MS B in steps 612 to 616.

The timing setup process is performed in such a manner that the MS A transmits a "Time_Measure( )_Request" message to the MS B, and in response thereto, the MS B transmits a "Time_Measure( )_ACK" message in step 612.

The MS A measures an RTD and, according to the measured RTD, sets and applies a new timer and a new counter. Further, the MS A transmits the measured RTD value to the MS B by using a "SetTimer( )_Indication" message in step 614.

The MS B then uses the timer/counter values in step 616.

According to the updated timer/counter values, a signaling message is completely exchanged in steps 620 to 640. If all steps are successfully performed, a VT call is continued in step 645 until it is terminated in step 650.

The process of exchanging the signaling message in steps 620 to 640 includes "mobile level detection" for determining an MS level in step 620, "master/slave determination" for determining a master/slave MS in step 625, "capability profile set exchange" for exchanging MS capability in step 630, "multiplex entry send procedure" for defining multiple transmission in step 635, and "logical channel (video/audio)" for determining logical channels in step 640.

Thereafter, the procedure of FIG. 6 ends.

Figure 7:
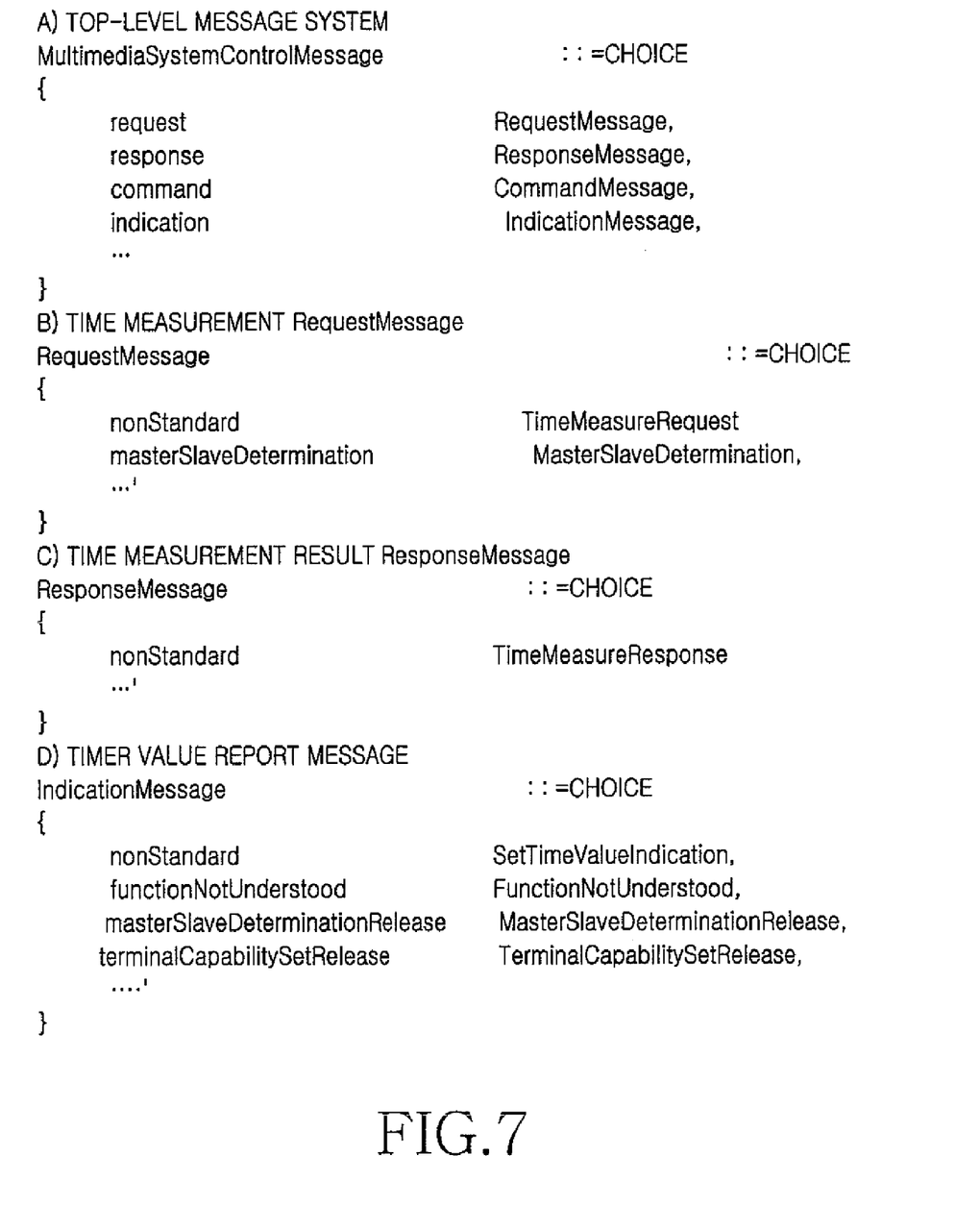
FIG. 7 illustrates an H.245 protocol message according to an exemplary embodiment of the present invention.

FIG. 7 illustrates an H.245 protocol message according to an exemplary embodiment of the present invention.

Referring to FIG. 7, messages (i.e., Time_Measure( )_Request, Time_Measure( )_ACK, and SetTimer( )_Indication) are used for a dynamic timer in an exemplary embodiment of the present invention. These messages use a message format of "request", "response", and "indication" in a top-level message configuration (a) (i.e., MultimeadiaSystemControlMessage) of the H.245 protocol.

The Time_Measure( )_Request message is used to request time measurement. Further, the Time_Measure( )_Request message uses a request message configuration (b), and is defined as "TimeMeasureRequest" in a nonstandard configuration.

The Time_Measure( )_ACK message is a response message for the Time_Measure( )_Request message. Further, the Time_Measure( )_ACK message uses a response message configuration (c), and is defined as "TimeMeasureResponse" in the nonstandard configuration.

The SetTimer( )_Indication message denotes a message for transmitting a timer value, i.e., the measured RTD value. Further, the SetTimer( )_Indication message uses an indication message configuration (d), and is defined as "SetTimeValueIndication" in the nonstandard configuration.

Time measurement described with reference to FIG. 5 to FIG. 7 is performed by the timer manager 450 of FIG. 4. In this case, a time value is measured to determine a timer. The determination result is stored and is transmitted to a counterpart MS. The counter manager 440 determines a counter by using the measured time value. Other functions are managed by the controller 420.

According to an exemplary embodiment of the present invention, a dynamic timer and a dynamic counter are used to deal with an RSS and an RTD in order to address wasted time resources and a low call success ratio when fixed timer/counter values are used in a repetitive and complex conventional signaling process in which requests and acknowledges are repeated between MSs. Therefore, exemplary embodiments of the present invention enable a VT call success ratio to be significantly increased.

While the present invention has been shown and described with reference to certain exemplary embodiments thereof, it will be understood by those skilled in the art that various changes in form and details may be made therein without departing from the spirit and scope of the present invention as defined by the appended claims and their equivalents. Therefore, the scope of the invention is defined not by the description of the exemplary embodiments of the present invention but by the appended claims and their equivalents, and all differences within the scope will be construed as being included in the present invention.

What is claimed is:

1. A method for determining a counter value and a timer value of a Mobile Station (MS) in a protocol negotiation process, the method comprising:
   measuring, by a timer manager, a Round Trip Delay (RTD) and a Radio Signal Strength (RSS) with respect to a counterpart MS;
   determining the timer value and the counter value according to the measured RTD and RSS; and
   exchanging a signaling message according to the determined timer value and counter value.

2. The method of claim 1, further comprising, before the measuring of the RTD and the RSS with respect to a counterpart MS, requesting a call for performing Video Telephony (VT) with a counterpart MS.

3. The method of claim 1, further comprising;
   performing Video Telephony (VT) when the signaling message is successfully exchanged.

4. The method of claim 1, wherein, if the measured RSS is strong and the measured RTD is short, the counter and the timer are set to default values.

5. The method of claim 1, wherein, if the measured RSS is strong and the measured RTD is long, the counter is set to a default value and the timer is set to an increased value.

6. The method of claim 1, wherein, if the measured RSS is weak and the measured RTD is short, the counter is set to an increased value and the timer is set to a default value.

7. The method of claim 1, wherein, if the measured RSS is weak and the measured RTD is long, the counter is set to an increased value and the timer is set to a decreased value.

8. A Mobile Station (MS) for determining a counter value and a timer value in a protocol negotiation process, the MS comprising:
   a timer manager for measuring a Round Trip Delay (RTD) and a Radio Signal Strength (RSS) with respect to a counterpart MS and for determining the timer value according to the measured RTD and RSS;
   a counter manager for measuring the RTD and the RSS with respect to the counterpart MS and for determining the counter value according to the measured RTD and RSS; and
   a controller for exchanging a signaling message according to the determined timer value and counter value.

9. The MS of claim 8, wherein, the controller requests a call for performing Video Telephony (VT) with the counterpart MS and performs the VT when the signaling message is successfully exchanged.

10. The MS of claim 8, wherein, if the measured RSS is strong and the measured RTD is short, the counter and the timer are set to default values.

11. The MS of claim 8, wherein, if the measured RSS is strong and the measured RTD is long, the counter is set to a default value and the timer is set to an increased value.

12. The MS of claim 8, wherein, if the measured RSS is weak and the measured RTD is short, the counter is set to an increased value and the timer is set to a default value.

13. The MS of claim 8, wherein, if the measured RSS is weak and the measured RTD is long, the counter is set to an increased value and the timer is set to a decreased value.

14. A method for performing Video Telephony (VT) using an H.245 protocol of a Mobile Station (MS), the method comprising:
   requesting a call, by a controller, for performing VT with a counterpart MS;
   transmitting a first request message for requesting a time measurement to the counterpart MS;
   receiving a first response message in response to the first request message;
   measuring a first time difference between an arrival time of the first response message and a transmission time of the first request message;
   transmitting the first time difference to the counterpart MS by using a first indication message;
   determining a timer value and a counter value according to the first time difference;
   exchanging a signaling message according to the determined timer value and counter value; and
   performing the VT when the signaling message is successfully exchanged.

15. The method of claim 14, further comprising, before the transmitting of the first request message for requesting time measurement to the counterpart MS:
   upon receiving a second request message for requesting a time measurement from the counterpart MS, transmitting a second response message to the counterpart MS;
   receiving a second indication message including a second time difference between an arrival time of the second response message and a transmission time of the second request message;
   determining a timer value and a counter value according to the second time difference;
   exchanging a signaling message according to the determined timer value and counter value according to the second time difference; and
   performing the VT when the signaling message is successfully exchanged.

16. The method of claim 15, wherein the first and second request messages for requesting a time measurement use a request message of at least one of a top-level message configuration of the H.245 protocol and a nonstandard configuration.

17. The method of claim 15, wherein the first and second response messages use a response message of at least one of a top-level message configuration of the H.245 protocol and a nonstandard configuration.

18. The method of claim 15, wherein the first and second indication messages use an indication message of at least one of a top-level message configuration of the H.245 protocol and a nonstandard configuration.

19. A Mobile Station (MS) for performing Video Telephony (VT), the MS comprising:
   a timer manager for measuring a first time difference between an arrival time of a first response message and a transmission time of a first request message for requesting a time measurement to a counterpart MS, for transmitting the first time difference to the counterpart MS by using a first indication message, and for determining a timer value according to the first time difference;
   a counter manager for determining a counter value according to the first time difference; and
   a controller for requesting a call for performing VT with the counterpart MS, for exchanging a signaling message according to the determined timer value and counter value, and for performing the VT when the signaling message is successfully exchanged.

20. The MS of claim 19, wherein, if a second request message for requesting time measurement is received from the counterpart MS before the first request message is transmitted to the counterpart MS, the timer manager transmits a second response message to the counterpart MS, receives a second indication message including a second time difference between an arrival time of the second response message and a transmission time of the second request message, and determines a timer value according to the second time difference.

21. The MS of claim 20, wherein the counter manager determines a counter value according to the second time difference.

22. The MS of claim 21, wherein the first and second request messages for requesting time measurement use a request message of at least one of a top-level message configuration of an H.245 protocol and a nonstandard configuration.

23. The MS of claim 21, wherein the first and second response messages use a response message of at least one of a top-level message configuration of an H.245 protocol and a nonstandard configuration.

24. The MS of claim 21, wherein the first and second indication messages use an indication message of at least one of a top-level message configuration of an H.245 protocol and also use a nonstandard configuration.

* * * * *